United States Patent [19]
Ritchie

[11] Patent Number: 4,827,282
[45] Date of Patent: May 2, 1989

[54] PRINT HEAD ASSEMBLY ACCELERATION CONTROL METHOD

[75] Inventor: Timothy D. Ritchie, Fairborn, Ohio

[73] Assignee: Eastman Kodak Company, Rochester, N.Y.

[21] Appl. No.: 239,356

[22] Filed: Sep. 1, 1988

[51] Int. Cl.[4] ........................ G01D 9/00; G01D 15/18; B41J 19/30

[52] U.S. Cl. ........................................ 346/1.1; 346/75; 346/76 PH; 346/140 R; 346/139 R; 400/320; 400/323; 400/328

[58] Field of Search ........................ 346/1.1, 75, 140 R, 346/76 PH, 139 R; 400/320, 323, 328

[56] References Cited

U.S. PATENT DOCUMENTS 4,050,564 9/1977 Carmichael et al. ............... 400/320
4,167,013 9/1979 Hosmins et al. ....................... 346/75
4,179,223 12/1979 Kwan et al. ......................... 400/320
4,469,460 9/1984 Hughes et al. ....................... 400/322

*Primary Examiner*—E. A. Goldberg
*Assistant Examiner*—Gerald E. Preston
*Attorney, Agent, or Firm*—Edward Dugas

[57] ABSTRACT

A control method for providing an acceptable motion window (range) that restricts high accelerations and velocities of an ink jet print head. The method provides two limited step ranges that are initiated dependent on the total distance that the print head is to be moved. If the distance is outside of the window range, a first step is used to bring the print head to a position which is a fixed second step from the final position. By limiting the print head's motion in each step range, the excitation of the fluid (ink) system is limited. With the first step completed, a second step range is used to drive the print head to the final position. If the initial distance is within the window range, the second step range is selected to drive the print head. The method is implemented with a computer program and print head position signals.

6 Claims, 3 Drawing Sheets

PRINT HEAD ASSEMBLY ACCELERATION CONTROL METHOD

FIELD OF THE INVENTION

The present invention relates to continuous ink jet printers and, more particularly, to a method for controlling the acceleration and velocity of the ink jet print head from one print position to another.

BACKGROUND OF THE INVENTION

In the art of ink jet printing, a print head assembly carrying one or more ink jets along with fluid lines, valves and electrical conductors is moved from one step (printing position) to another in response to a control signal. A severe motion could be caused in the print head if the distance to a step is short or if the distance is long. Inconsistencies in the settling position of the print head along with excitation differences in the fluid system occur when the print head is subjected to differing velocities and accelerations between print positions.

In U.S. Pat. No. 4,025,928 entitled "Unitary Ink Jet and Reservoir" by S. L. Hou et al., the ink jet pen is surrounded by an ink reservoir except at its printing orifice. A helical coil of tubing is wound within the reservoir and connects the ink jet pen to the source of the liquid in the reservoir. The tubing is energy absorbing such that the effects of acceleration on the ink are dampened by the tubing as the tubing urges the ink reservoir to follow the ink jet pen.

Another patent of interest is U.S. Pat. No. 4,463,362 entitled "Ink Control Baffle Plates for Ink Jet Printer" by J. E. Thomas. The device of that patent utilizes a movable ink reservoir which directly carries a plurality of ink jet print heads. Within the reservoir there is included a plurality of baffle plates that are positioned to provide individual ink tanks for each of the print heads. The plates decrease the sloshing motion of the ink as the reservoir is accelerated and decelerated. As can be seen, the two aforementioned patents are directed to a solution to the problem of the ink moving away from the feed of an ink jet printer under the influence of acceleration. As also can be appreciated by persons skilled in the art, when an ink jet print head is accelerated to a high level due to the distance between the present print position and the next print position being relatively far away, as the head approaches the final print position, it tends to reach the final position differently than if the final position were relatively close to the previous print position. To maintain a quality print product, it is necessary to have consistency not only in the ink flow but also in the positioning of the print head to the print position.

SUMMARY OF THE INVENTION

In the present invention, the problem of ink sloshing and inconsistent positioning of the print head at the print position because of the variance in the distance between the previous print position and the next print position is addressed.

In the method of the present invention, a request to move the print head to a new position is analyzed to determine the net move. The net move is equal to the new step (position) minus the current step (position) in pixel units. The printing speed is then compared with a draft speed. If the selected speed for the printer equals the draft speed, the maximum permissible number of printing positions (pixel positions) that the print head is permitted to move is set at a first value. In the preferred embodiment, the first value is 70 pixels. If the selected speed does not equal the draft speed, then a second maximum move, equivalent to a slightly larger number of pixels is used. In the preferred embodiment, the second value is 90 pixels. The selection of the first or the second maximum pixel move is then compared against the number of pixels in the net move and, if the number of pixels for the net move exceeds the selected maximum number of pixels, then an intermediate move to an intermediate step (position) is programmed by determining the number of pixels between the current step (position) and the new step (position) minus 64 pixels. This is a step forward of at least 6 pixels.

Draft speed, as the term is used in the present description, does not apply to the speed of the print head; it refers to the operating (printing) speed of the entire printing system. It affects the print head motion in that at the higher or draft speed there is less time available during which motion must be accomplished. (Also, reduced print quality is acceptable at draft speed, so therefore somewhat higher acceleration defects are tolerated.) There are only two discrete speeds for the printer system: draft speed and quality speed.

If the maximum pixel move is not exceeded by the number of pixels for the net move, then a minimum pixel move is compared against the number of pixels in the net move. In the preferred embodiment, the value is 4 pixels. If the number of pixels for the net move does not equal or exceed the minimum number of pixels, then an intermediate move to an intermediate step (position) is programmed by determining the number of pixels between the current step (position) and the new position minus 64 pixels. This is a step backward of at least 61 pixels.

The program logic selection is then fixed such that the remaining distance to the new step (position) is achieved with normal position drive, and always in a forward direction. If an intermediate move has been programmed, this step will be exactly 64 pixels. Otherwise, this step will be the net move originally requested.

From the foregoing, it can be seen that it is the primary object of the present invention to provide an improved ink jet print head positioning method.

It is a further object of the present invention to provide a method for limiting the accelerations experienced by an ink jet type print head.

It is a further object of the present invention to provide an improved ink jet print head positioning method for achieving a high degree of consistency in the final print head position.

These and other objects of the present invention will become more apparent when taken in conjunction with the following description and drawings wherein like characters indicate like parts and which drawings form a part of the present specification.

DESCRIPTION OF THE PREFERRED EMBODIMENT

Figure 1:
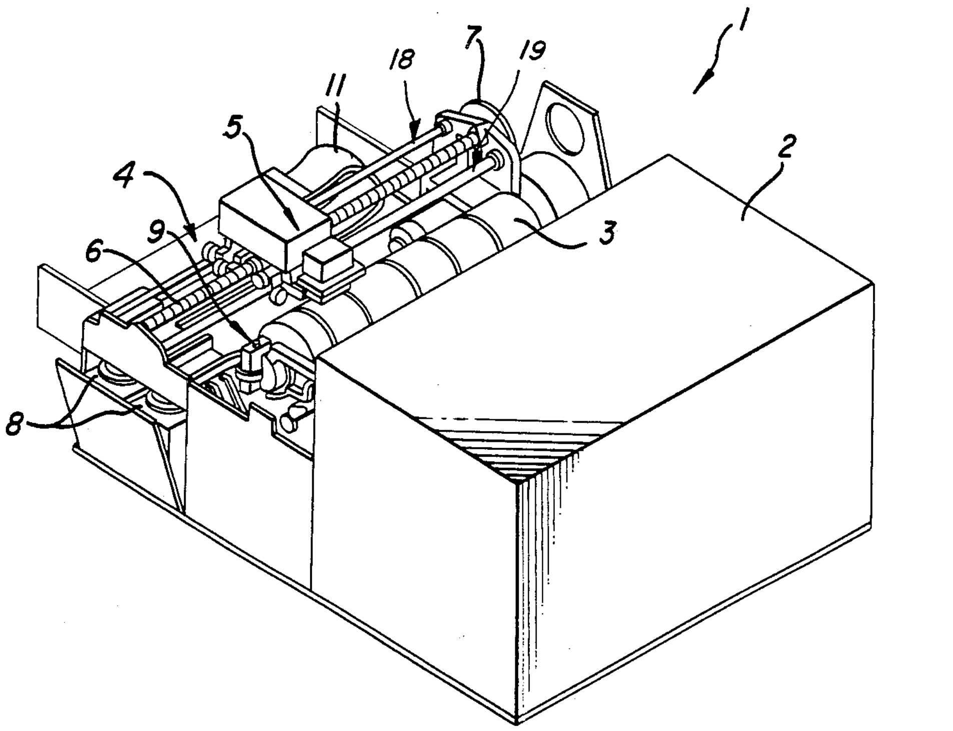
FIG. 1 is a perspective view of an ink jet printer of the continuous type on which the method of the present invention can be practiced.

FIG. 1 illustrates an exemplary ink jet apparatus 1 employing the embodiment of the present invention. In general, the apparatus 1 comprises a paper feed sector 2 from which sheets are transported into operative relation on a printing cylinder 3. When printed, the sheets are discharged into a bin area 4. Also illustrated generally in FIG. 1 is a print head assembly 5 which is mounted for movement along parallel rails 18 and 19 under control of a drive motor 7, which drive motor is in turn coupled to a helical drive shaft 6.

During a printing operation, the print head assembly 5 is traversed across the print path in closely spaced proximity to a print sheet which is rotating on cylinder 3. Ink is supplied to and returned from the print head assembly by means of flexible conduits 11 coupled to an ink cartridge(s) 8.

Figure 2:
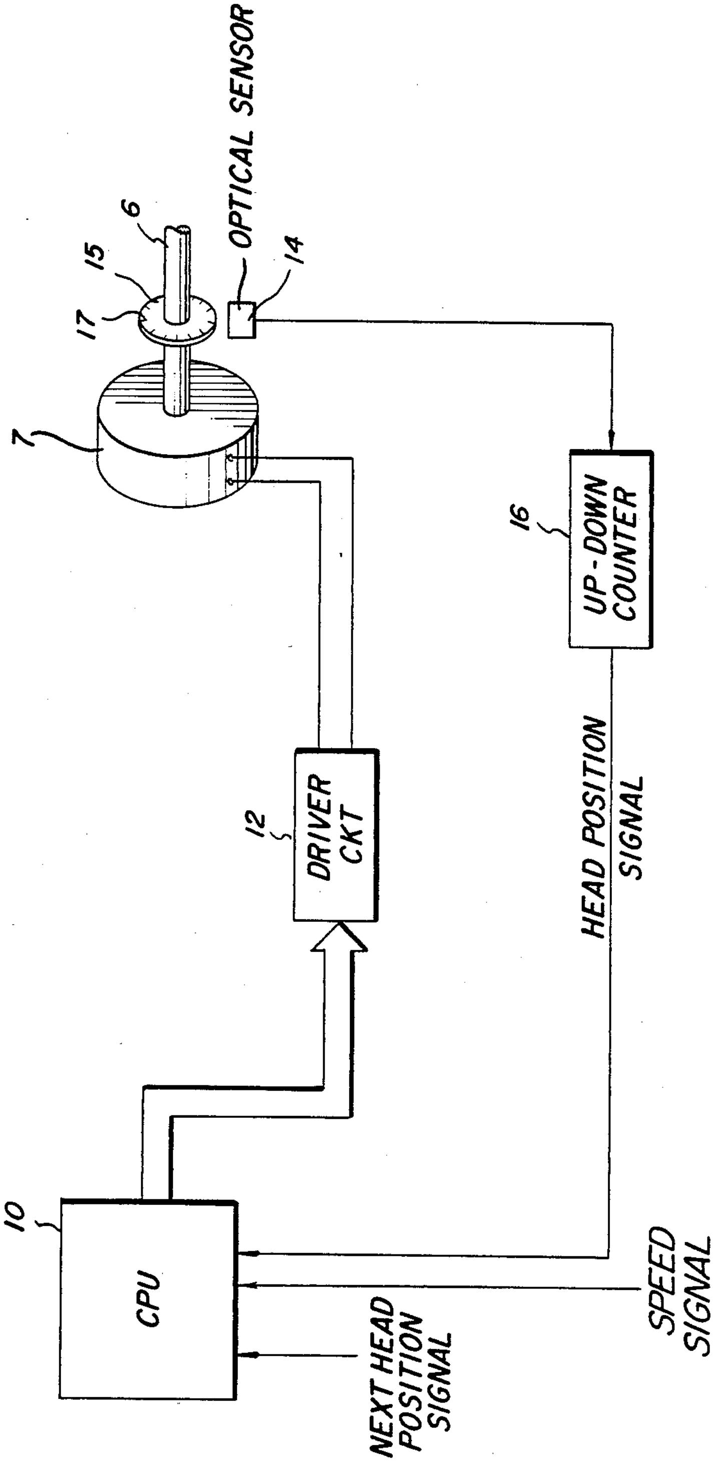
FIG. 2 is a block diagram illustrating the pixel position detector and the central processing unit for driving the motor connected to the print head drive shaft.

Referring now to FIG. 2, the drive shaft 6 is provided with a code wheel 17 that has a plurality of optical index marks 15. Each corresponds to a print (pixel) position on the face of the rotatable cylinder 3. An optical sensor 14 is positioned adjacent the encoding disk 17 to provide an electrical pulse each time an index 15 passes before the sensor 14. An up-down counter 16 is electrically coupled to the optical sensor 14 and provides a head position signal from an internal count. The count corresponds to the actual pixel position of the print head assembly along the surface of the rotatable cylinder 3. The head position signal is directed as an input to a computing element CPU 10 which may be a microprocessor. Also as an input to the CPU 10 is a speed signal corresponding to the operating (printing) speed of the printer system, signalling either high speed (draft) or low speed. Also as an input to the CPU 10 is a next head position signal corresponding to the next position desired by the input data for the printing of the next pixel in a line of print. The output signal from the CPU 10 is connected to the input to a driver circuit 12. The driver circuit provides, in response to the position signal from the CPU, a driving potential to the drive motor 7 for rotating the shaft 6 in a direction and for an amount which positions the print head assembly at the next desired print position. Although one redimentary type of print head position control is shown in FIG. 2, it will be obvious to those persons skilled in the art that many modifications may be made to this control system to achieve the desired printing pattern.

Figure 3:
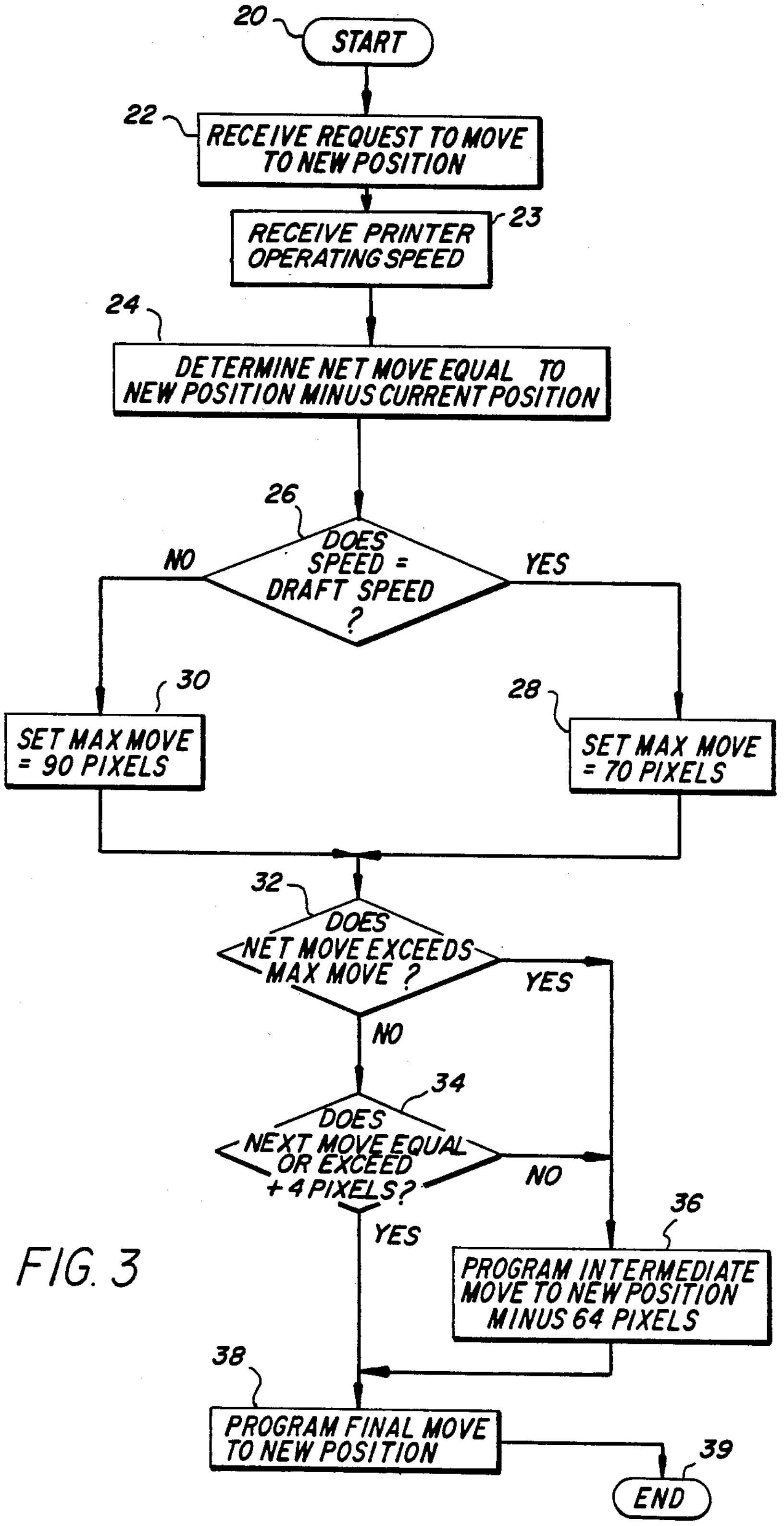
FIG. 3 is a flow chart illustrating the method of the present invention in a program logic flow diagram form.

The program logic flow diagram of FIG. 3 represents the method steps of the present invention, implemented as a software program operating on the CPU 10. The start block 20 represents the commencement of the signal processing that is started with the step of receiving a request to move the printing head to a new position, illustrated as block 22. The next step of the method is to determine the net move between the current position and the new position, illustrated as block 24. This is accomplished in the preferred embodiment by determining the difference between the number of the pixel representing the present position and the number of the pixel representing the new position. A decision block 26 operates upon the speed signal received as an input. If the speed requested does not equal the draft speed, then the maximum move that is permitted is a step increment equal to 90 pixel positions, as per block 30. If the speed is equal to the draft speed, then the maximum move increment is set equal to 70 pixels, as per block 28.

In a decision block 32, the question is asked "does the net move exceed the maximum move selected (either by block 30 or block 28)?" If the answer is "YES," then an intermediate move is programmed into the total move. The intermediate move is set equal to the number of pixels to the new position minus 64 pixels. This is reflected by an action block 36. If the answer from the decision block 32 is "NO," then the question "does the net move equal or exceed +4 pixels?" is asked in the decision block 34. If the answer is "YES," the program is activated and the print head assembly is driven to its new position in block 38 to end this cycle in block 39. If the answer is "NO," there is a branching to the block labeled 36 wherein an intermediate move position is set equal to the new position minus 64 pixels. The final 64 pixels are reached at normal speed in block 36.

As can be gleaned from the foregoing description, the purpose of the present invention is to define acceptable motion windows for restricting high accelerations and velocities of an ink jet print head assembly so that the final settling position of the ink jet print head carries with it a degree of consistency irrespective of the distance that the head has to move to the new position. In addition, consistency is provided in the movement of the ink jet print head in that the ink flow is not interrupted and/or otherwise disturbed due to the sloshing caused by acceleration.

While there has been shown what is considered to be the preferred embodiment of the invention, it will be manifest that many changes and modifications may be made therein without departing from the essential spirit of the invention. It is intended, therefore, in the annexed claims to cover all such changes and modifications as may fall within the true scope of the invention.

I claim:

1. A print head assembly acceleration control method comprising the steps of:

(a) determining the net number of print positions from a present print position to a next print position;

(b) determining if the printer system operating speed is equal to a draft speed or not;

(c) if equal to the draft speed, set the maximum move equal to a first number of print positions;

(d) if not equal to the draft speed, set the maximum move equal to a second number of print positions;

(e) determine if the net number of print positions exceeds the maximum number of print positions established in step (c) or step (d) based on the printer system operating speed;

(f) if the net number of print positions exceeds the maximum number of print positions, program an intermediate move to the new position minus a selected number of print positions; and (g) if the net number of print positions does not exceed the maximum number of print positions, determine if the net number of print positions equals or exceeds a small fixed number of print positions; if so, program the move to the next position, if it does not then program an intermediate move to the new position minus a selected number of print positions and program the move to the final print position.

2. The print head assembly acceleration control method according to claim 1 wherein the first number of print positions is 70, the second number of print positions is 90, the selected number of print positions is 64, and the small fixed number of print positions is 4 print positions.

3. A print head assembly acceleration control method comprising the steps of:

(a) determining the distance between a present print position and the next print position;

(b) if the distance exceeds a fixed number of positions, divide the move into at least two separate moves with the last move being equal to a fixed number of printing positions so as to limit the acceleration of said print head assembly in approaching the new print position; and (c) if the distance does not equal or exceed a small fixed number of print positions, divide the move into at least two separate moves by backing off from the present position to reapproach the next position with the last move being equal to a fixed number of printing positions so as to limit the acceleration of said print head assembly in approaching the new print position.

4. The print head assembly acceleration control method according to claim 3 wherein the fixed number of printing positions of the last move is 64 printing positions.

5. A print head assembly acceleration control method comprising the steps of:

(a) determining the distance between a present print head assembly position and a desired print position;

(b) determine if the distance exceeds a maximum amount based on the printer system operating speed;

(c) if the distance does exceed the maximum amount, program an intermediate move to an intermediate position from the desired print position, that will not exceed the maximum amount;

(d) if the distance does not equal or exceed a minimum amount, program an intermediate move to a position away from the desired position that will not exceed the maximum amount; and (e) move the print head assembly to the desired print position from the intermediate position.

6. The print head assembly acceleration control method according to claim 5 wherein said intermediate position is approximately 64 print positions from the desired print position.

* * * * *